United States Patent [19]

Otsuki et al.

[11] Patent Number: 4,603,920
[45] Date of Patent: Aug. 5, 1986

[54] HYDRAULIC PRESSURE CONTROL DEVICE FOR USE IN VEHICLE ANTI-SKID BRAKING SYSTEM

[75] Inventors: Hiromi Otsuki; Ryoichi Matsuura; Hiroshi Fujinami; Shinichi Hori, all of Anjo; Yoshihisa Nomura, Toyota; Hiroyuki Oka, Susono, all of Japan

[73] Assignee: Nippondenso Co., Ltd., Kariya, Japan

[21] Appl. No.: 667,221

[22] Filed: Nov. 2, 1984

[30] Foreign Application Priority Data

Nov. 4, 1983 [JP]   Japan ................................ 58-208026

[51] Int. Cl.⁴ ............................................. B60T 8/02
[52] U.S. Cl. ...................................... 303/10; 303/116; 303/119
[58] Field of Search ................... 303/119, 116, 61–63, 303/68–69, 10–12, 91, 92, 100, 113, 114, 115; 188/181 A, 181 R, 181 C, 181 T

[56] References Cited

U.S. PATENT DOCUMENTS

| 3,532,391 | 10/1970 | Klein | 303/119 |
| 4,090,739 | 5/1978 | Iio | 303/10 |
| 4,278,300 | 7/1981 | Bacher | 303/115 |

FOREIGN PATENT DOCUMENTS 0051645   4/1980   Japan ................................ 303/119

*Primary Examiner*—Douglas C. Butler
*Attorney, Agent, or Firm*—Cushman, Darby & Cushman

[57] ABSTRACT

A hydraulic pressure control device in a vehicle anti-skid braking system includes a brake master cylinder, a wheel brake actuating cylinder for braking a wheel in response to a fluid pressure from the brake master cylinder, a directional control valve connected between the brake master cylinder and the wheel brake actuating cylinder and shiftable between pressure-increasing and pressure-decreasing modes, and a pressure control valve for connecting the brake master cylinder to a fluid pressure return passage having a reservoir, a pump, and an accumulator when the directional control valve is in the pressure-increasing mode.

4 Claims, 3 Drawing Figures

HYDRAULIC PRESSURE CONTROL DEVICE FOR USE IN VEHICLE ANTI-SKID BRAKING SYSTEM

BACKGROUND OF THE INVENTION

The present invention relates generally to a vehicle anti-skid braking system, and more particularly to a hydraulic pressure control device with a kickback prevention capability in such a vehicle anti-skid braking system.

Various anti-skid braking systems for use in motor vehicles have been proposed and practiced for optimizing a hydraulic braking pressure under the control of a control unit to provide a more effective and safer braking action when the vehicle is braked in different road conditions. U.S. Pat. Nos. 4,090,739 and 4,278,300, for example, illustrate such anti-skid braking systems. However, prior anti-skid braking systems have proven unsatisfactory in that the brake pedal is subjected to a kickback during operation of the system.

SUMMARY OF THE INVENTION

It is an object of the present invention to provide a hydraulic pressure control device in vehicle anti-skid braking systems which is capable of preventing a brake pedal from being subjected to a kickback at the time of braking the vehicle and also from suffering a shock when the brake pedal is depressed.

According to the present invention, there is provided a hydraulic pressure control device in a vehicle anti-skid braking system, comprising a brake master cylinder, a wheel brake actuating cylinder, a master cylinder passage extending from the master cylinder, a fluid pressure supply passage connected between the master cylinder passage and the wheel brake actuating cylinder, a control unit responsive to a wheel condition for generating a command signal, a directional control valve disposed in the fluid pressure supply passage and having at least pressure-increasing and pressure-decreasing modes, the directional control valve being normally in the pressure-increasing mode to open the fluid pressure supply passage, a fluid pressure return passage connected to the directional control valve, and at least one a pressure control valve connected between the fluid pressure supply passage and the fluid pressure return passage, the pressure control valve being shiftable between a first position to cut off communication between the fluid pressure supply passage and the fluid pressure return passage and a second position to allow communication between the fluid pressure supply passage and the fluid pressure return passage, the pressure control valve being normally in the first position, the directional control valve being actuatable into the second position in response to the command signal for connecting the wheel brake actuating cylinder through the fluid pressure return passage to the fluid pressure supply passage when the directional control valve is in the presssure-increasing mode. The fluid pressure return passage includes a reservoir disposed in the fluid pressure return passage for storing a fluid from the brake actuating cylinder when the directional control valve is in the pressure-decreasing mode, a fluid pressure pump disposed in the fluid pressure return passage for pressurizing the fluid from the reservoir, and an accumulator connected to the fluid pressure return passage for storing the energy of the fluid under pressure in the fluid pressure return passage. The pressure control valve comprises a two-position solenoid-operated valve connected to the directional control valve.

BRIEF DESCRIPTION OF THE DRAWINGS

The present invention will be described in detail by way of illustrative example with reference to the accompanying drawings, in which.

DETAILED DESCRIPTION

Figure 1:
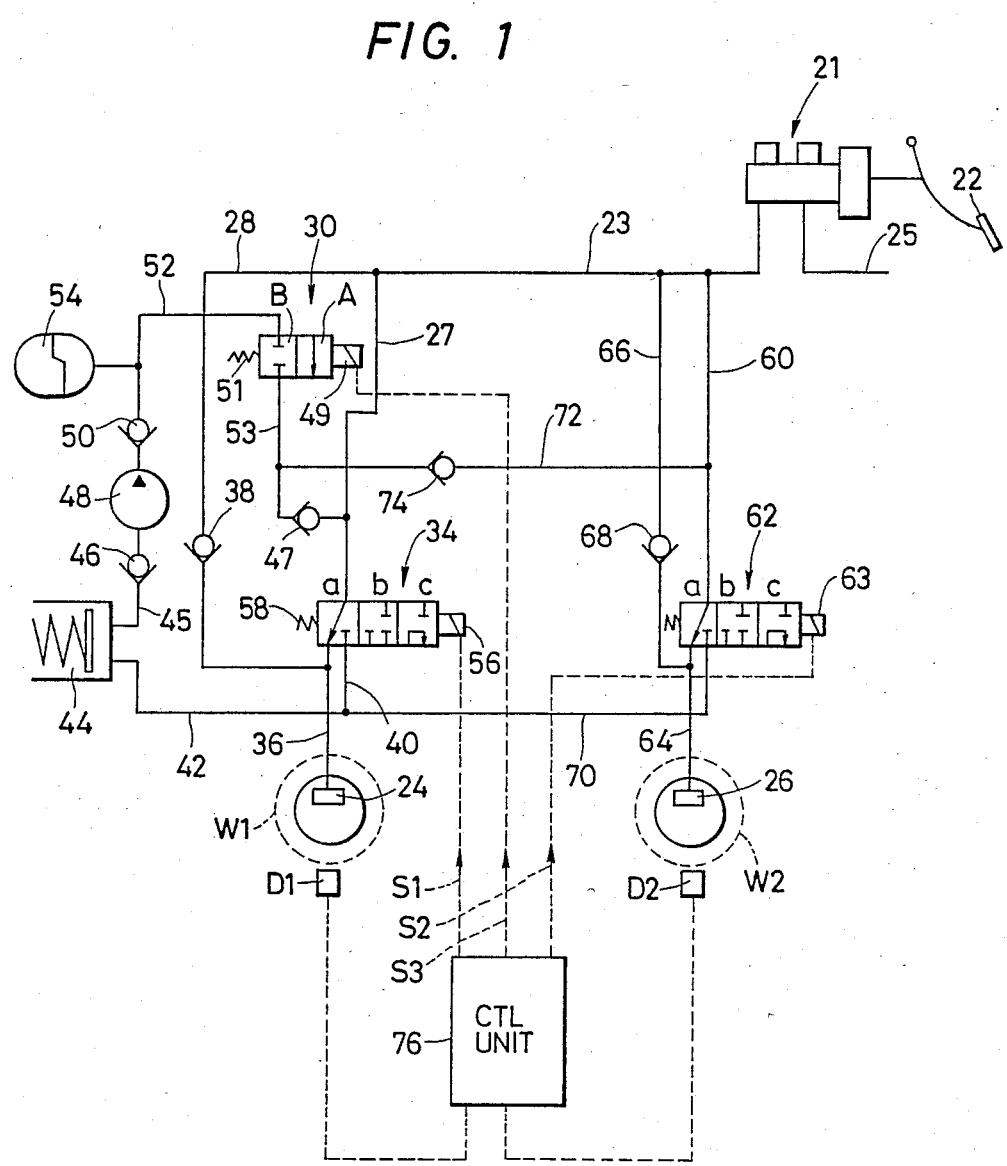
FIG. 1 is a schematic diagram of a hydraulic pressure control device according to the present invention in a vehicle anti-skid braking system.

Like or corresponding parts are denoted by like or corresponding reference characters throughout views.

As shown in FIG. 1, a hydraulic pressure control device in a vehicle anti-skid braking system includes a master cylinder 21 operatively coupled with a brake pedal 22. The master cylinder 21 has a first hydraulic pressure generating chamber (not shown) connected through a pipe 23 to brake actuating cylinders 24, 26 for front wheels W1, W2. The master cylinder 21 also has a second hydraulic pressure generating chamber (not shown) connected through a pipe 25 to brake actuating cylinders for rear wheels (not shown). More specifically, the pipe 23 is branched into supply pipes 27, 60 and a return pipe 28. The supply pipe 27 is connected through a directional control valve 34 and a pipe 36 to the brake actuating cylinder 24.

The return pipe 28 is coupled through a check valve 38 and the pipe 36 to the brake actuating cylinder 24, the check valve 38 allowing the fluid to flow only in a direction from the brake actuating cylinder 24 to the master cylinder 21. A pipe 40 is connected to the directional control valve 34 and also connected through a pipe 42, a reservoir 44, a pipe 45, a check valve 46, a hydraulic pressure pump 48, a check valve 50, and a return pipe 52 to a port of a two-port, two-position pressure control valve 30. An accumulator 54 is coupled to the return pipe 52. The check valves 46, 50 are oriented such that they permit a fluid flow only in the direction from the reservoir 44 to the pressure control valve 30. The pressure control valve 30 has another port connected through a pipe 53 and a check valve 47 to the supply pipe 27. The check valve 47 allows a fluid flow only from the pressure control valve 30 to the directional control valve 34. The pressure control valve 30 is a spring-biased solenoid-operated valve having a solenoid 49 and normally biased by a spring 51 in a direction to cut off fluid communication between the ports of the valve 30 in a cutoff position B. Thus, when the solenoid 49 is energized, the valve 30 is shifted against the bias of the spring 51 to provide fluid communication between the ports, that is, between the pipes 52, 53 in a communicating position A.

The directional control valve 34 is a spring-biased solenoid-operated valve of the three-port and three-position type. When a high excitation current is passed through a solenoid 56 of the valve 34, the valve 34 is actuated to the leftmost or actuated position c against the bias of a spring 80 of the valve 34. When a low excitation current is supplied to the solenoid 78, the valve 34 is positioned in an intermediate position b. When no excitation current flows through the solenoid 78, the valve 34 is biased to the rightmost or normal position a (shown in FIG. 1) under the force of the spring 80.

To the brake actuating cylinder 26 of the other front wheel W2, there is connected a supply pipe 60 branched from the pipe 23 through a directional control valve 62 identical in construction to the directional control valve 34 and a pipe 64. The brake actuating cylinder 26 is also connected to the master cylinder 21 through a return pipe 66 branched from the pipe 23, a check valve 68, and the pipe 64. A pipe 70 connected to the directional control valve 62 is connected through a pipe 70 and the pipe 42 to the reservoir 44. The pipes 53, 60 are interconnected through a pipe 72 and a check valve 74 which allows a fluid flow only from the pipe 53 to the pipe 60.

Although not shown, the brake actuating cylinders of the rear wheels are connected to the pipe 25 through substantially the same arrangement as that for the front wheels W1, W2.

Wheel speed sensors D1, D2 are associated respectively with the front wheels W1, W2. The wheel speed sensors D1, D2 generate pulse signals having frequencies proportional to the speeds of rotation of the wheels W1, W2 and apply such pulse signals to a control unit 76. The control unit 76 is responsive to the applied signals for computing wheel speeds, slip rates, decelerations to generate control signals S1, S2, S3. The control signals S1, S2 are supplied to the solenoids 56, 63 of the directional control valves 34, 62. When the control signal is of a high level, the solenoid exciting current is of a high level. When the control signal is of an intermediate level, the solenoid exciting current is also of an intermediate level. When the control signal is of a low level, then no solenoid exciting current is supplied. Therefore, when the control signals S1, S2 are of high, intermediate, and low levels, respectively, the directional control valves 34, 62 are moved to the actuated position c, the intermediate position b, and the normal position a, respectively. The control signals will be high in level when the fluid pressure in the brake actuating cylinders 24, 26 is to be reduced. The control signals will be intermediate in level when the fluid pressure in the brake actuating cylinders 24, 26 is to be maintained. The control signals will be low in level when the fluid pressure in the brake actuating cylinders 24, 26 is to be increased. Therefore, when the directional control valves 34, 62 are in the actuated position c, they are in a pressure-decreasing mode. When the directional control valves 34, 62 are in the intermediate position b, they are in a pressure-maintaining mode. When the directional control valves 34, 62 are in the normal position a, they are in a pressure-increasing mode.

The control signal S3 from the control unit 76 is applied to the solenoid 49 of the pressure control valve 30. When one or both of the directional control valves 34, 62 are in the normal position a or in the pressure-increasing mode, the control signal S3 is applied to energize the solenoid 49 to shift the pressure control valve 30 toward the communicating position A against the bias of the spring 51. When no control signal S3 is applied, the pressure control valve 30 is in the cutoff position B (shown in FIG. 1) under the bias of the spring 51.

The directional control valves and the pressure control valve for the rear wheels are similarly controlled by the control unit 76 for braking the rear wheels. The control unit 76 of the above functions is of a simple conventional arrangement that could easily be achieved by those skilled in the art and hence will not be described in detail.

Figure 2:
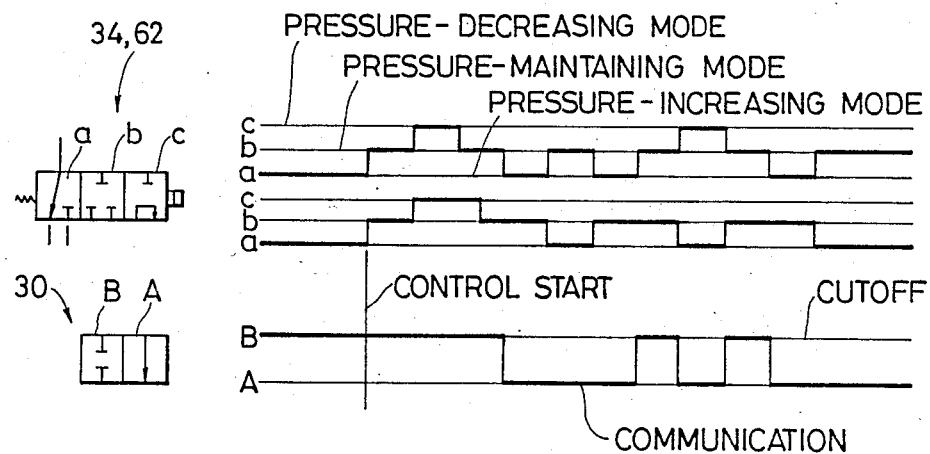
FIG. 2 is a diagram showing control timing for a two-position pressure control valve and a direction control valve in the hydraulic pressure control device shown in FIG. 1.

Operation of the hydraulic pressure control device thus constructed will be described with reference to FIGS. 1 and 2.

The driver now starts depressing the brake pedal 22 while the motor vehicle is running at a constant speed. At the time of starting braking the vehicle, the control unit 76 is responsive to detected signals from the wheel speed sensors D1, D2 for determining that each wheel has not yet reached a prescribed deceleration and slip rate. The control signals S1, S2 are therefore low in level, and the directional control valves 34, 62 are in the normal position a. At this time, the pressure control valve 30 is in the cutoff position B to prevent the pump 68 from communicating with the pipes 27, 60. The fluid pressure from the master cylinder 21 is applied through the pipe 23, the supply pipes 27, 60, the directional control valves 34, 62, and the pipes 36, 64 to the brake actuating cylinders 24, 26 to thereby brake the front wheels W1, W2. The front wheels W1, W2 are normally braked since they have not yet reached the prescribed deceleration and slip rate and the pressure control valve 30 is in the cutoff position B, though the directional control valves 34, 62 are in the pressure-increasing mode. The braking fluid is prevented by the check valves 38, 68 from flowing from the master cylinder 21 into the pipes 46, 64.

The rear wheels are also braked in the same manner.

When the braking fluid pressure is increased and the front wheels W1, W2 reach and are just about to exceed the predetermined deceleration and slip rate, the control signals S1, S2 go high in level to shift the directional control valves 34, 62 toward the actuated position c in which the pipes 27, 36 and the pipes 60, 64 are disconnected, and the pipes 36, 40 and the pipes 64, 70 are connected. The braking fluid now flows from the brake actuating cylinders 24, 26 through the pipes 64, 70, 36, 40, 42 into the reservoir 44. The fluid pressure pump 48 starts operating when either the control signal S1 or S2 reaches the high level, so that the braking fluid is drawn by the pump 48 from the reservoir 44, pressurized, and then delivered through the check valve 50 and the return pipe 52 into the accumulator 54 and the pressure control valve 30. Since the directional control valves 34, 62 are not in the pressure-increasing mode at this time, the pressure control valve 30 is in the cutoff position B, and the pressure energy of the braking fluid is stored in the accumulator 54. The same operation is carried out with respect to the rear wheels. Therefore, the brake pedal 22 is not subjected to any kickback due to an unwanted pressure buildup in the pipe 23.

When the deceleration of the wheels W1, W2 restores a prescribed level and is about to become lower than the prescribed level, the control signals are at the intermediate level to actuate the directional control valves 34, 62 into the intermediate or neutral position b. The pipes 27 and 36, 40 and the pipes 60 and 64, 70 are then disconnected. The braking fluid pressure now remains maintained at a constant level. At this time, the pump 48 discharges the fluid from the reservoir 44 into the pipe 52, but no kickback is produced as described above. The above operation holds true for the rear wheels.

Upon the wheels W1, W2 reaching a predetermined acceleration, the control signals S1, S2 go low to shift the directional control valves 34, 62 to the actuated position a or the pressure-increasing mode. The pipes 27, 36 and the pipes 60, 64 are brought into communication to increase the braking force on the wheels W1, W2. The fluid discharged from the pump 48 and from the accumulator 54 is allowed by the pressure control valve 30 to go into the pipes 27, 60 from which the fluid is supplied into the brake actuating cylinders 24, 26. Accordingly, any shortage of the fluid under pressure within the pipes 27, 36, 60, 44 and the brake actuating cylinders 24, 26 is compensated for to reduce any unwanted shock on the brake pedal 22 as it is depressed. In case there is no fluid flow under pressure from the pump 48 and the accumulator 54, any fluid flow is prevented by the check valves 47, 74 from going from the pipes 27, 60 to the pressure control valve 30.

By applying the control signal S3 to open the pressure control valve 30 in synchronism with, or slightly earlier or later than the control valves S1, S2, the fluid under pressure from the pump 48 and the accumulator 54 can quickly compensate for any shortage of the fluid under pressure within the pipes 27, 36, 60, 44 and the brake actuating cylinders 24, 26. Therefore, suitable adjustment of the timing with which the pressure control valve 30 is opened with respect to the control signals S1, S2 is effective in reducing any shock that would be imposed on the brake pedal 22 when the brake pedal 22 would be abruptly stopped under increased fluid pressure after the brake pedal 22 has been depressed. The fluid under pressure returning from the pipe 53 is also supplied toward the master cylinder 21 through the pipes 27, 60. However, since the pressure-increasing mode continues only in a short period of time such as about 10 msec., the brake pedal 22 is subjected to no substantial kickback.

The pressure control valve 30 is in the communicating position A as lonw as either one of the directional control valves 34, 62 is in the pressure-increasing mode to prevent any shock from being applied to the brake pedal 22. As described above, the pressure control valve 30 is adjustable in switching timing so as to be switched at the same time that, after, or before the directional control valves 34, 62 starts the pressure-increasing mode for minimizing any shock on the brake pedal 22.

The above control operation is repeated until the motor vehicle reaches a desired speed or is stopped, whereupon the driver releases the brake pedal 22. The pressure in the portions of the return pipes 28, 66, which are closer than the check valves 38, 68 to the master cylinder 21, is lowered to permit the braking fluid to return from the cylinders 24, 26 through the pipes 36, 27, 23 and the pipes 64, 66, 23 back into the master cylinder 21. The braking fluid from the brake actuating cylinders of the rear wheels is also returned to the master cylinder 21 through the pipe 25 in the same manner.

Figure 3:
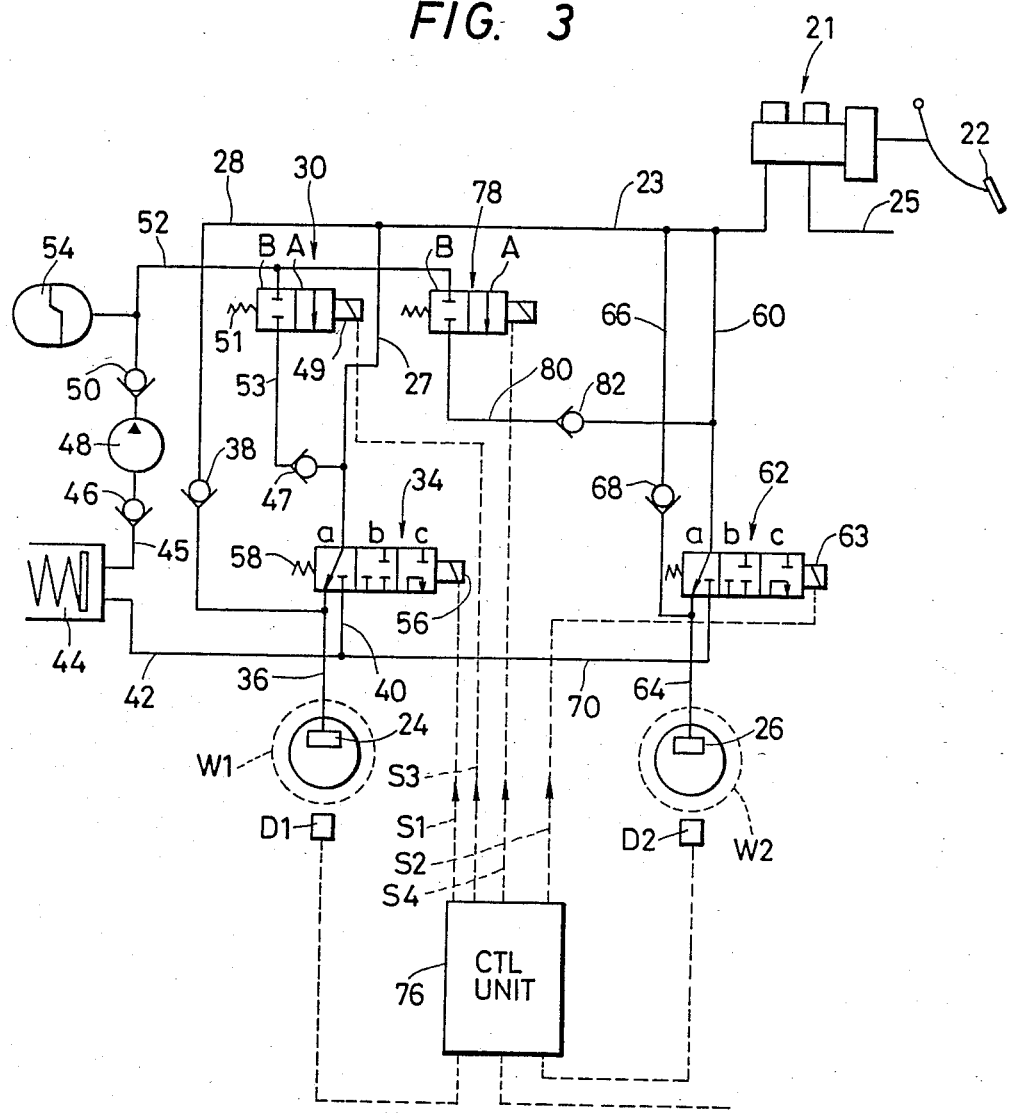
FIG. 3 is a schematic diagram of a hydraulic pressure control device according to another embodiment of the present invention.

FIG. 3 illustrates a hydraulic pressure control device according to another embodiment of the present invention. The hydraulic pressure control device of FIG. 3 differs from that of FIG. 1 in that the pipe 72 and the check valve 74 are dispensed with, and an additional pressure control valve 78 of the same construction as that of the pressure control valve 30 is connected between the pipe 52 and the pipe 62 through a pipe 80 and a check valve 82. The check valve 82 allows the fluid to flow only in a direction from the pressure control valve 78 to the pipe 60. The control unit 76 supplies control signals S3, S4 when the respective directional control valves 34, 62 are in the pressure-increasing mode or in the normal position a. The control signals S3, S4 are applied respectively to the pressure control valves 30, 78 for shifting them to the communicating position A to supply the fluid under pressure from the pump 48 and the accumulator 54 to the directional control valves 34, 62.

The hydraulic pressure control device of FIG. 3 is more advantageous than the hydraulic pressure control device of FIG. 1 in that the pressure control valves 30, 78 can be shifted to the cutoff or communicating position independently of each other in response to the control signals S3, S4 from the control unit 76. Therefore, the pressure control valves 30, 78 can control the directional control valves 34, 62 and hence the braked conditions of the wheels W1, W2 independently of each other. This independent braking control mode is of importance especially when the wheels W1, W2 run on road surfaces having difference coefficients of friction. For example, one of the wheels may run on a concrete road surface having a higher coefficient of friction while the other wheel may run on a frozen road surface at the same time. Under such a road condition, the wheel running on the concrete road surface needs to be braked with a greater braking force than the braking force with which the other wheel on the frozen road surface is to be braked. The independently controlled pressure control valves 30, 78 have another advantage. When one of the wheels is braked with an increased braking force, the fluid under pressure supplied to produce such an increased braking force is not fed to the directional control valve for the other wheel which is not braked with such an increased braking forece. As a consequence, the fluid pressure generated by the pump 48 is not subjected to an unwanted pressure drop and the brake pedal 22 is prevented from suffering an undesired shock.

The two-position solenoid-operated pressure control valves 30, 78 in FIGS. 1 and 3 may be replaced with valves of other types which will be open when the directional control valves 34, 62 are in the presssure-increasing mode and will be closed when the directional control valves 34, 62 are in the other modes. The directional control valves 34, 62 may be of another design for providing only pressure-increasing and pressure-decreasing modes dependent on the extent to which the wheels skid. The directional control valve 34(62) may be a combination of an on-off valve disposed in the pipe 27(60) and an on-off valve disposed in the pipe 40(70).

Although certain preferred embodiments of the present invention have been shown and described in detail, it should be understood that various changes and modifications may be made therein without departing from the scope of the appended claims.

What is claimed is:

1. A hydraulic pressure control device in a vehicle anti-skid braking system, comprising:
 (a) a brake master cylinder operable for producing a fluid pressure;
 (b) wheel brake actuating cylinder means for applying a braking force dependent on said fluid pressure to a wheel;
 (c) fluid pressure supply passage means connected between said brake master cylinder and said wheel brake actuating cylinder means;

(d) directional control valve means disposed in said fluid pressure supply passage means for supplying the fluid pressure from said brake master cylinder to said wheel brake actuating cylinder means in a pressure-increasing braking mode and for disconnecting said wheel brake actuating cylinder means from said brake master cylinder and guiding the fluid pressure from said wheel brake actuating cylinder means to an outlet of the directional control valve means to reduce the braking force on said wheel in a pressure-decreasing anti-skid control mode;

(e) control means for generating a command signal in response to deceleration of said wheel as it is braked in the normal braking mode and applying said command signal to said directional control valve means to initiate the pressure-decreasing anti-skid control mode;

(f) reservoir means connected to said outlet of the directional control valve means for temporarily storing the fluid pressure from said outlet as a low-pressure fluid in said pressure-decreasing anti-skid control mode;

(g) fluid pressure pump means connected to said reservoir means for pumping the low-pressure fluid from said reservoir means as a high-pressure fluid;

(h) accumulator means connected to said fluid pressure pump means for accumulating the high-pressure fluid from said fluid pressure pump means; and (i) solenoid-operated pressure control valve means connected between said accumulator means and said fluid pressure supply passage means coupled to an inlet of said directional control valve means, said solenoid-operated pressure control valve means being shiftable under the control of said generating control means between a closed position to cut off communication between said accumulator means and said fluid pressure supply passage means when said directional control valve means is in said pressure-decreasing anti-skid control mode and an open position to allow the high-pressure fluid to be supplied from said accumulator means to said directional control valve means when the directional control valve means enters from said pressure-decreasing anti-skid control mode into said pressure-increasing braking mode.

2. A fluid pressure control device in a vehicle anti-skid braking system, comprising:

(a) a brake master cylinder operable for producing a fluid pressure;

(b) a pair of wheel brake actuating cylinders for applying a braking force dependent on said fluid pressure to a pair of respective wheels;

(c) a pair of fluid pressure supply passages connected between said brake master cylinder and said wheel brake actuating cylinders, respectively;

(d) a pair of directional control valves disposed in said fluid pressure supply passages, respectively, for supplying the fluid pressure from said brake master cylinder to said wheel brake actuating cylinders in a pressure-increasing braking mode and for disconnecting said pressure-increasing braking mode and for disconnecting said wheel brake-actuating cylinders from said brake master cylinder and guiding the fluid pressure from said wheel brake actuating cylinders to outlets of the directional control valvds to reduce the braking force on said wheels in a pressure-decreasing anti-skid control mode;

(e) control means for generating a command signal in response to deceleration of said wheels as they are braked in the normal braking mode and applying said command signal to said directional control valves to initiate the pressure-decreasing anti-skid control mode;

(f) reservoir means connected to said outlets of the directional control valves for temporarily storing the fluid pressure from said outlets as a low-pressure fluid in said pressure-decreasing anti-skid control mode;

(g) fluid pressure pump means connected to said reservoir means for pumping the low-pressure fluid from said reservoir means as a high-pressure fluid;

(h) accumulator means connected to said fluid pressure pump means for accumulating the high-pressure fluid from said fluid pressure pump means; and (i) solenoid-operated pressure control valve means connected between said accumulator means and said fluid pressure supply passages coupled to inlets of said directional control valve means, said solenoid-operated pressure control valve means being shiftable under the control of said generating control means between a closed position to cut off communication between said accumulator means and said fluid pressure supply passage when said directional control valves are in said pressure-decreasing anti-skid control mode and an open position to allow the high-pressure fluid to be supplied from said accumulator means to said directional control valves when the directional control valves enter from said pressure-decreasing anti-skid control mode into said pressure-increasing braking mode.

3. A fluid pressure control device according to claim 2, wherein said generating control means is responsive to deceleration of said wheels for generating a pair of independent command signals, said solenoid-operated pressure control valve means comprising a pair of solenoid-operated valves independently connected to said directional control valves, respectively.

4. A fluid pressure control device having a wheel braking cylinder in a vehicle anti-skid braking system, comprising:

(a) pressure means for transmitting a fluid pressure to the wheel braking cylinder;

(b) a fluid passage supply passage extending from said pressure means and connected to the wheel braking cylinder;

(c) control means responsive to a wheel condition for generating a command signal;

(d) directional control valve means disposed in said fluid pressure supply passage and having at least a pressure-increasing braking mode and a pressure-decreasing anti-skid control mode, said directional control valve means being normally in said pressure-increasing braking mode to open said fluid pressure supply passage to allow the fluid pressure to be applied from said fluid pressure supply passage to said wheel braking cylinder and being actuatable into said pressure-decreasing anti-skid control mode in response to said command signal for closing said fluid pressure supply passage and releasing said fluid pressure from said wheel braking cylinder;

(e) reservoir means connected to an outlet of said directional control valve means for temporarily storing the fluid pressure from said outlet as a low-pressure fluid in said pressure-decreasing anti-skid control mode;

(f) fluid pressure pump means connected to said reservoir means for pumping the low-pressure fluid from said reservoir means as a high-pressure fluid;

(g) accumulator means connected to said fluid pressure pump means for accumulating the high-pressure fluid from said fluid pressure pump means; and (h) solenoid-operated pressure control valve means connected between said accumulator means and said fluid pressure supply passage coupled to an inlet of said directional control valve means, said solenoid-operated pressure control valve means being shiftable under the control of said generating control means between a closed position to cut off communication between said accumulator means and said fluid pressure supply passage when said directional control valve means is in said pressure-decreasing anti-skid control mode and an open position to allow the high-pressure fluid to be supplied from said accumulator means to said directional control valve means when the directional control valve means enters from said pressure-decreasing anti-skid control mode into said pressure-increasing braking mode.

* * * * *